Figure 1:
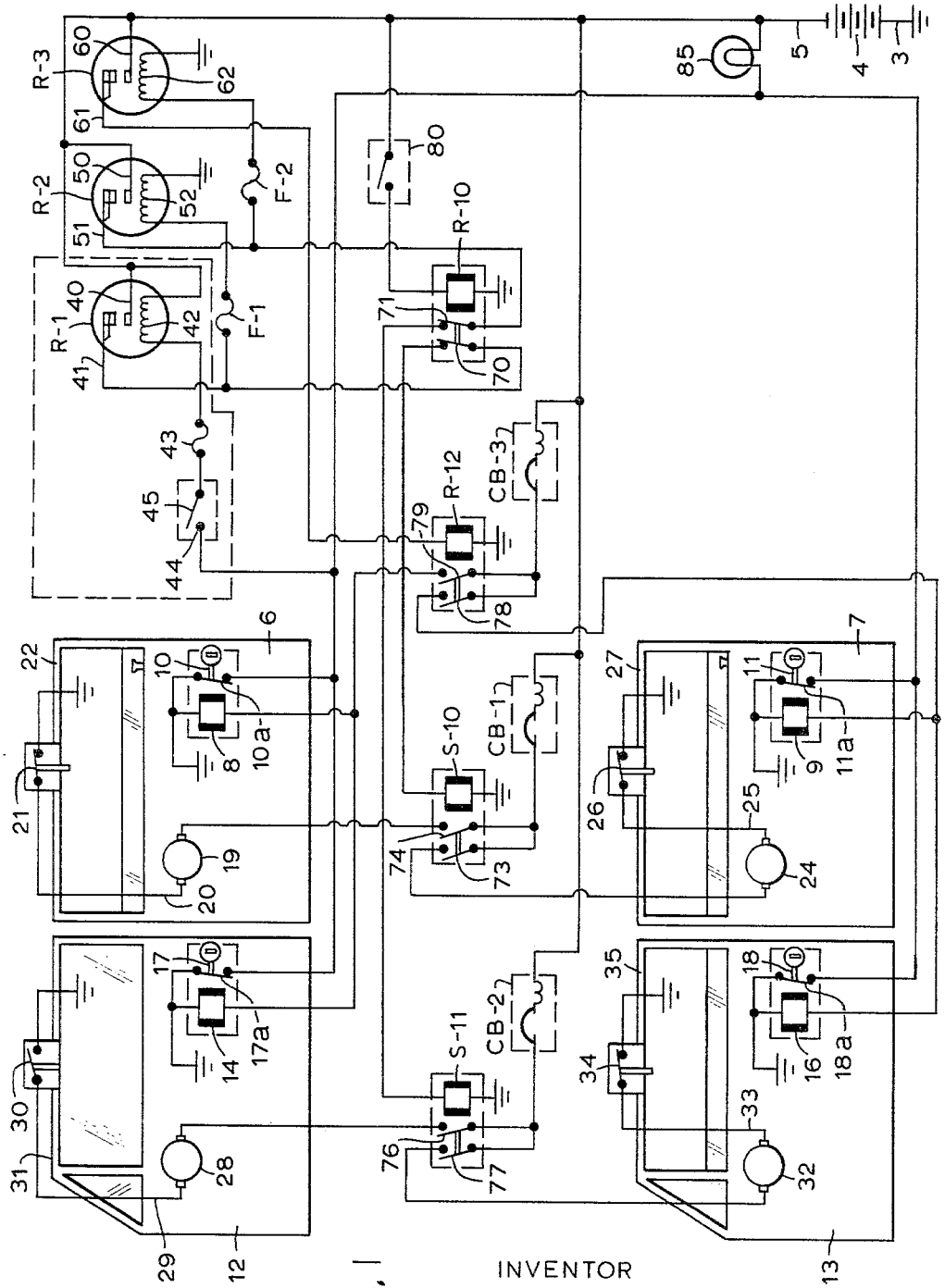

INVENTOR
JOHN N. ACKMAN
BY Gravely, Lieder + Woodruff
ATTORNEYS

United States Patent Office 3,228,490
Patented Jan. 11, 1966

3,228,490
AUTOMATIC AUTOMOBILE LOCKING DEVICE
John N. Ackman, 1547 Northwest End Blvd.,
Cape Girardeau, Mo.
Filed Apr. 16, 1964, Ser. No. 360,217
9 Claims. (Cl. 180—82)

The present invention relates to automatic automobile locking device, and more particularly to automatic door locking and window closing systems for automobiles.

In recent years the more expensive model automobiles have utilized electrical systems for raising and lowering the windows, as well as electrical systems for simultaneously locking all the doors. In general all the systems have been completely independent one from another and were not operable except by persons inside the automobile. Such locking systems and window closing systems have been merely a convenience and not effective safety features to the owners of expensive automobiles. By safety feature it is meant, safety from theft of the automobile because the owner or driver inadvertently left the automobile with the ignition key therein or just left without locking the doors and windows.

The present invention insures against theft of expensive automobiles by the automatic feature of the time delay system of the invention which closes the windows and locks the doors of the automobile on any occasion when a master activation switch is positioned in the ready setting such that any time a door is unlocked it is automatically relocked and the windows, if any be down, are closed. The invention operates in conjunction with any usual electrical window system and door lock system.

Briefly, the system consists of a series of time relays and solenoids which control both the door locking and window closing function required to secure an automobile to minimize theft.

It is therefore a principal object of the present invention to provide an automatic automobile electrical monitoring system for locking the doors and closing the windows under preset conditions.

It is another object of the invention to provide an automatic electrical system for door locking and window closing in an automobile or similar vehicle which is activated either by a master switch or manual key locking.

It is a further object of the invention to provide a door locking and window closing system which is activated as a result of a door being unlocked, and that relocks the doors if in the unlocked condition and closes any open windows.

A still further object of the invention is to provide an electrical automatic door locking and window closing system for an automobile in which, upon activation by a master switch, the doors will automatically lock if they have first been closed and all the windows are in the raised position.

It is another object of the invention to provide an electrical automatic door locking and window closing system for an automobile that is conditioned for operation by a master control wherein the windows are closed before the doors can be locked, but will operate regardless of the position of the door whether it be open or closed.

It is a further object of the invention to provide an automatic door locking and window closing system which includes an ignition switch override which deactivates the window closing circuit while the engine is running or the ignition is on, yet retains the automatic door locking feature.

It is another further object of the invention to provide an automatic door locking and window closing system for an automobile which is conditioned for operation by a master switch within said automobile or by the key lock in a door wherein the windows are closed and the doors are locked after being closed and, if subsequently unlocked, will automatically reclose the windows if open and relock such unlocked door, said system including an ignition switch override which disables the window closing portion of the system while the door locking system remains automatically operative.

It is another further object of the invention to provide an automatic closure locking and unlocking system in combination with a window opening and closing system having a master control for selecting automatic or manual functioning.

Figure 2:
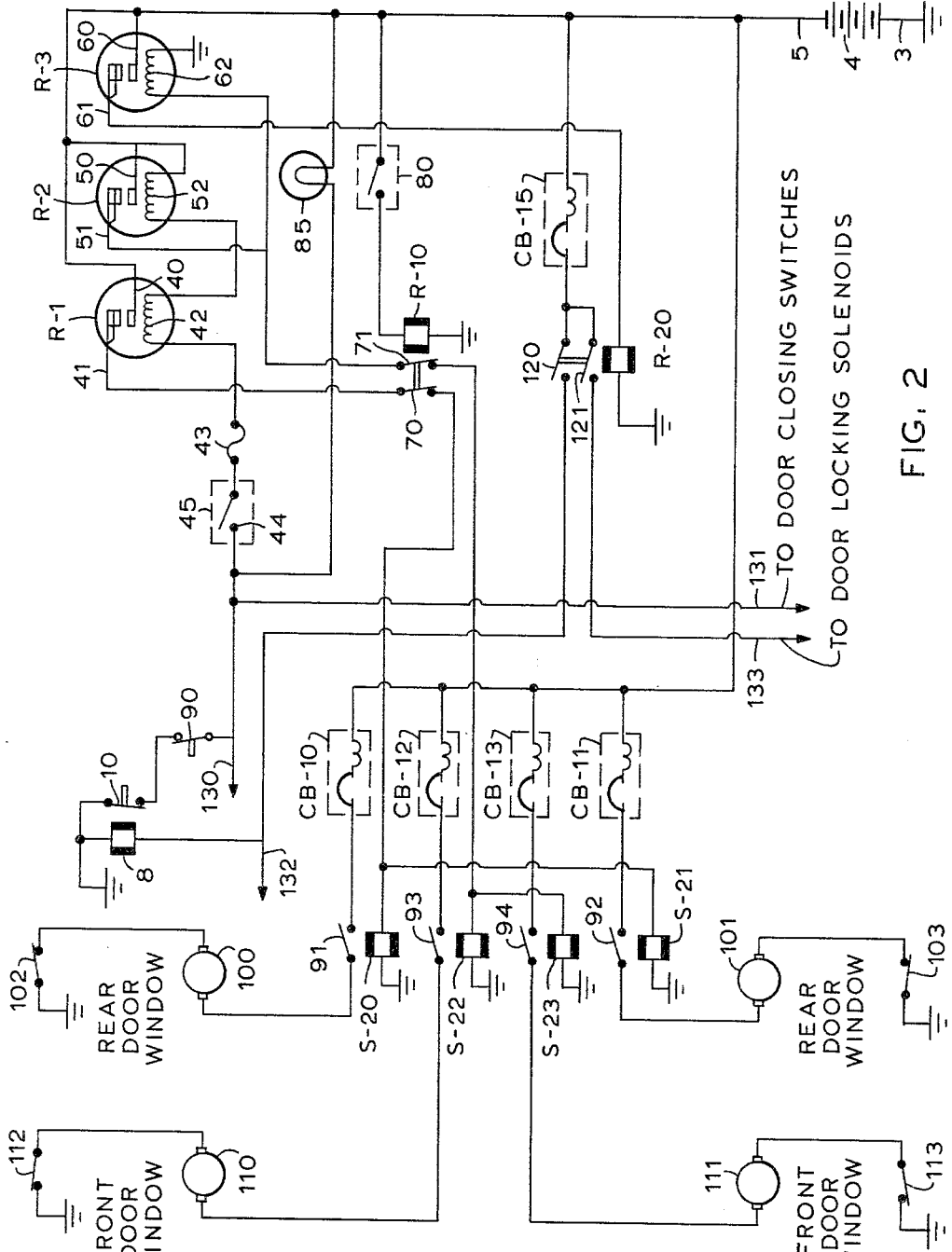
Figure 3:
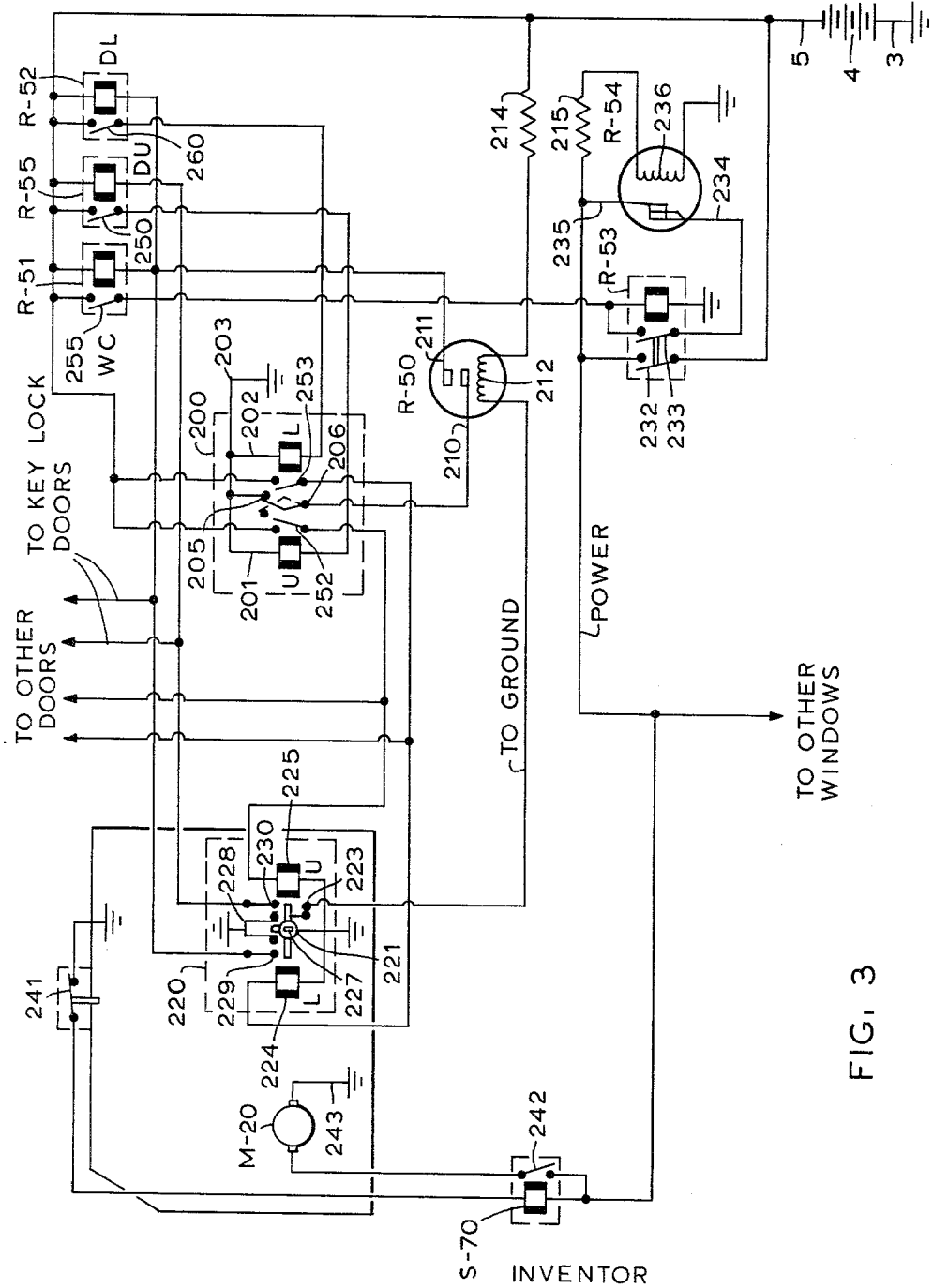

These and other features and objects of the invention will become readily apparent to those skilled in the art when from the description hereinafter taken in conjunction with the appended claims and the drawings wherein:

FIG. 1 is a schematic of the preferred embodiment of the invention utilizing a master switch to condition the window closing and door locking system;

FIG. 2 is a modification to the system of FIG. 1 wherein the door locking portion of the system has a door closed interlock switch which prevents the windows closing and the doors locking unless the doors are closed, including a window closing ignition switch override; and FIG. 3 is a schematic of the door locking and window closing mechanism including the master switch and key lock door activating mechanism which conditions the system for operation by either the master switch or door key activation.

Referring specifically to FIG. 1 there is illustrated the preferred embodiment in schematic representation of four doors to an automobile and a window in each door with the associated electrical control system appertaining to the invention for operating the door locks and closing the windows. A source of power 4 is provided with its positive terminal 3 grounded and a negative terminal 5. Rear doors 6 and 7 have door lock solenoids 8 and 9, respectively. Associated with solenoid 8 is a latch 10 which locks door 6 when it is activated. Solenoid 9 has a latch 11 which operates to lock door 7 when the solenoid 9 is activated. Front doors 12 and 13 have door locking solenoids 14 and 16 respectively. A latch 17 is associated with solenoid 14 which locks door 12 when solenoid 14 is activated. Solenoid 16 has associated therewith a latch 18 which locks door 13 when solenoid 16 is activated. Rear door 6 has a window drive motor 19 which is grounded at contact 20 through an interlock or limit switch 21 at the top of window frame 22 of door 6. Door 7 has a window motor 24 which is grounded at contact 25 through an interlock or limit switch 26 in window frame 27 of door 7. Door 12 houses a window motor 28 which is grounded at contact 29 through an interlock or limit switch 30 mounted on window frame 31 of door 12. Door 13 has a window motor 32 which is grounded at contact 33 through an interlock or limit switch 34 of window frame 35 in door 13.

Window drive delay timer or relay R–1 is provided for supplying power to window motors 19 and 24. Delay relay R–1 has a contact 40 which is coupled to terminal 5 of power source 4. Contact 41 of relay tube R–1 is coupled through a normally closed contact 70 of relay R–10 and through a solenoid S–10, controlling window motors 19 and 24 through contacts 74 and 73, to ground. Contact 41 is also coupled to the heater of window drive delay relay R–2. Contact 40 is coupled through heater winding 42, through a fuse 43 and through master switch 45 to latch contacts 10a, 11a, 17a and 18a of door locking solenoids 8, 9, 14 and 16 respectively, which contacts are closed when the doors are in an unlocked condition thereby furnishing a ground connection to heater coil 42 of the tube R–1. Contact 41 of delay relay R–1 is coupled through fuse F–1 to heater 52 of delay timer or relay R–2 which has its other side grounded. Delay relay R–2 has a contact 50 coupled to contact 5 of power source 4. Delay relay R–2 has a contact 51 which is coupled through a normally closed contact 71 of the relay R–10 to solenoid S–11, controlling window motors 28 and 32 through contacts 76 and 77, to ground. Door lock delay relay R–3 has a heater 62 with a ground connection and being coupled through a fuse F–2 to contact 51 of delay relay R–2. Relay R–3 has a power contact 60 coupled to contact 5 of power source 4. Delay relay R–3 has a contact 61 which is coupled to a relay R–12. Delay relays R–1, R–2 and R–3 are relay tubes of the kind which make electrical connection between a pair of contacts after a certain period of time that the heating coil is activated and then remain closed so long as the coils are heated.

With master switch 45 closed any door 6, 7, 12 or 13 which is unlocked will connect coil heater 42 of relay R–1 to ground through master switch 45 causing delay relay R–1 to become energized and contacts 40 and 41 to be made, thus energizing solenoid S–10 through contact 70 of relay R–10 and at the same time providing power to heater 52 through fuse F–1. Solenoid S–10 closes contact 73 and 74 supplying power from power line 5 through circuit breaker CB–1 to motors 24 and 19, respectively, which close the windows in doors 6 and 7. When the windows in doors 6 and 7 are closed, the interlock switches 21 and 26 respectively, are opened to break the motor circuits and stop the motors 19 and 24. After relay R–2 has been energized by heater 52 being coupled to the power source 4 through contacts 40 and 41 of relay R–1, contacts 50 and 51 are made supplying power through contact 71 of relay R–10 to solenoid S–11. When solenoid S–11 is activated contacts 76 and 77 are closed supplying power through circuit breaker CB–2 which is coupled to power source 4 to operate the motors 28 and 32 to close the windows in doors 12 and 13. When contacts 50 and 51 of relay R–2 are closed, a circuit also is provided to heater 62 of relay tube R–3 through fuse F–2. After the time delay of relay R–3, contacts 60 and 61 are made supplying power from power source 4 at contact 5 to relay R–12. When relay R–12 is activated it closes contacts 78 and 79 supplying power through circuit breaker CB–3 to door locking solenoids 8, 9, 14 and 16 in doors 6, 7, 12 and 13 respectively. When door locking solenoids 8, 9, 14 and 16 are activated, the door latches 10, 11, 17 and 18 are operated to lock the doors 6, 7, 12 and 13 and simultaneously the contacts 10a, 11a, 17a and 18a respectively, are broken to open the circuit to the time delay relay R–1 causing its contacts 40 and 41 to open.

So that the windows may be raised and lowered independently of the door locking circuits during operation of the vehicle (that is, without being raised or closed each time a door is unlocked), an ignition controlling override or disabling switch 80 is provided to activate relay R–10 when the ignition switch is turned on. Relay R–10 opens contacts 70 and 71 thereby opening the circuits to the solenoids S–10 and S–11 and preventing the window closing operation of time delay relays R–1 and R–2, when such are activated in normal sequence by the opening or unlocking of a door 6, 7, 12 or 13. For purposes of monitoring the door lock operation, a pilot light 85 is provided between contact 5 of power source 4 and contact 44 of master switch 45. Thus, when any door is unlocked and its respective latch contact is closed to ground the contact 44 of master switch 45, the monitoring light 85 will be activated.

Referring to FIG. 2 a further embodiment of the invention is depicted wherein similar reference characters refer to identical parts depicted in FIG. 1. Relays R–1, R–2, are provided in parallel operation for controlling circuits to the rear and front window motors, as in FIG. 1, but the heaters 42 and 52 thereof are serially connected in a heater circuit with the master switch 45. The main control circuit also includes a latch switch or contact that is closed when the door latch 10 is unlocked and, in addition, a door interlock switch 90 is provided so that the circuit is only completed through the closed switch 90 when the door is closed. When master switch 45 is closed and door interlock switch 90 is closed and the door is unlocked so that the latch contact 10 is closed, heater 42 and heater 52 of delay relays R–1 and R–2 are grounded and power is supplied from contact 5 of power source 4 at contact 50 through heaters 42 and 52. Normally, heater 42 requires a shorter time to activate contacts 40 and 41 than heater 52 requires to activate contacts 50 and 51. Such a delay minimizes overload of the entire circuit by effecting operation of the rear windows before the front window circuits are completed. When contacts 40 and 41 of timer R–1 close they supply power through contact 70 of R–10 to solenoids S–20 and S–21 which close contacts 91 and 92, respectively, supplying power to rear door window motors 100 and 101. Window motor 100 is grounded through window closed interlock or limit switch 102 and window motor 101 is grounded through window closed interlock or limit switch 103. Either shortly thereafter or concurrently with the operation of relay R–1, delay relay R–2 closes contacts 50 and 51 supplying power through contact 71 of relay R–10 to solenoids S–22 and S–23 which close contacts 93 and 94, supplying power to front door window motors 110 and 111, respectively. Window motors 110 and 111 are connected to ground through window closed interlock or limit switches 112 and 113, respectively. The power side of contacts 91, 92, 93 and 94 of solenoids S–20, S–21, S–22 and S–23, respectively, are coupled through circuit breakers CB–10, CB–11, CB–12 and CB–13 to contact 5 of power source 4. The window motors 100, 101, 110 and 111 are automatically cut off when window closed interlock switches 102, 103, 112 and 113 are opened signifying the windows have been fully closed or when circuit breakers CB–10, CB–11, CB–12 and CB–13 are overloaded by window jamming or some other factor to automatically cut off the motors.

Contact 51 of delay relay R–2 also is coupled through heater 62 of relay R–3 to ground. Thus when contacts 50 and 51 of relay R–2 are made power is supplied to heater 62 to close contacts 60, 61, which supplies power to energize relay R–20. When R–20 is energized contacts 120, 121 are closed to supply power through circuit breaker CB–15 to the door locking solenoids, such as solenoid 8, thus causing the doors to be locked and opening the circuit to the contact 44 of master switch 45 cutting off the power supplied to relays R–1 and R–2.

A monitoring light 85 is provided between contact 5 of power source 4 and contact 44 of master switch 45. Thus, any time contact 44 of master switch 45 is grounded indicating an unlocked and closed door, monitoring light 85 remains on. Similar to the embodiment in FIG. 1, an ignition controlling interlock or disabling switch 80 is provided so that while the ignition is on, relay R–10 is energized holding contacts 70 and 71 open to prevent power being supplied to window motor starting solenoids S–20, S–21, S–22 and S–23 and energizing window motors 100, 101, 110 and 111. Thus, when any door becomes unlocked with the ignition on, the windows may be operated independently by conventional power circuits to a raised or lowered condition regardless of the door lock condition. Hence, if the car is stopped and a door opened to let out a passenger or for any other reason and then reclosed, the door will automatically be locked but open windows will not be closed.

In FIG. 2 only one door lock solenoid 8 and latch 10 and only one door closed interlock switch 90 has been illustrated (the term "door closing switch" used herein with reference to switch 90 indicates a type of switch that is closed upon the closing of the door). However, arrows 130 and 131 illustrate leads to other door closing switches and arrows 132 and 133 depict leads to other door locking solenoids. Other door closing switches and door locking solenoids could be utilized for such things as latches for trunk lids or other compartments which it is desired to have automatically locked.

Referring to FIG. 3 there is illustrated another embodiment of the invention which utilizes similar circuitry as the previous embodiments but adds features not illustrated in FIGS. 1 and 2. For purposes of simplicity only one door locking arrangement and one window closing arrangement are illustrated. However, as many windows or doors as are desired could be added quite readily to the system.

In FIG. 3 a master control device referred to generally as 200 is provided. The control has an unlocking solenoid 201 and a locking solenoid 202. One side of each solenoid is grounded through contact 203. The ungrounded side of locking solenoid 202 is coupled to normally open contact 260 of relay R-52 whereas the ungrounded side of unlocking solenoid 201 is connected to normally open contact 250 of relay R-55. When closed, contacts 250 and 260 supply energizing power from source 4 to solenoids 201 and 202, respectively. The solenoids have associated therewith a several position switch having contacts 205, 252 and 253 which provide appropriate circuit connections for operating the door unlocking and locking solenoids and for activating the window closing relay R-51.

A time delay relay tube R-50 has a pair of normally open contacts 210 and 211. Contact 210 is connected to contact 205 of the several position switch 200 and contact 211 is connected to the solenoid coils of relays R-51 and R-52. Relay tube R-50 has a heater 212 which is coupled through resistor 214 to power source 4 at contact 5. Heater 212 is grounded through the door lock mechanism generally designated 220. Whenever heater 212 of delay relay R-50 is activated contacts 210 and 211 are made to complete a ground circuit to window closing relay R-51 and door locking relay R-52 so long as contact 205 of the several position switch is grounded.

Door locking mechanism 220 has a locking solenoid 224 and an unlocking solenoid 225. Associated with the armature of unlocking solenoid 225 is a switch contact 223 which is coupled to heater 212. The armature or latch arm of unlocking solenoid 225 is grounded in its unlocked position to a contact 221. Associated with door lock mechanism 220 is a key slot 227 which activates a grounded cam switch 228 whenever the door is locked or unlocked with a key. Contact 230 of switch 228 is connected to door unlocking relay R-55 such that switch 228 grounds the door unlocking relay R-55 whenever the door is unlocked with the key. Also, contact 229 is connected to door locking relay R-52 which supplies a ground from switch 228 whenever the door is locked with the key.

When door locking relay R-52 is activated by ground being supplied from contact 211 of relay R-50 or from key switch 228 through contacts 229, contact 260 of relay R-52 is closed supplying power to master locking solenoid 202, switching the master lock to close spring biased contact 206 to the position shown in FIG. 3 and to close contact 253, and momentarily energizing locking solenoid 224 of the door locking mechanism 220 and any other door locking solenoids. When solenoid 224 is activated, contact 223 is broken thus ungrounding heater 212 and causing contacts 210 and 211 of relay R-50 to break.

Whenever ground is supplied to door unlock relay R-55 through unlocking switch 228 and contact 230, contact 250 of door unlocking relay is made supplying power to unlocking solenoid 201. Whenever energized, unlocking solenoid 201 momentarily closes spring biased contact 252 supplying power to energize unlocking solenoid 225 of the door unlocking mechanism 220, and any other unlocking solenoids connected thereto. When unlocking solenoid 201 is activated it switches contact 205 to a neutral position removing the ground from contact 210 of relay tube R-50. Whenever contact 210 is ungrounded heater 212 although activated to close contacts 210 and 211 will not ground relay R-51 and R-52 to cause the door locking and window closing sequence to occur.

When contact 255 of window closing relay R-51 is made, power is supplied to a latching or holding relay R-53 which has a pair of contacts 232 and 233. Contact 233 is coupled to the contact 234 of delay relay tube R-54. Contact 234 makes connection with its normally closed contact 235. Contact 235 is coupled through a resistor 215 to heater 236 of relay tube R-54 and to ground. When the relay solenoid R-53 is energized and contacts 232 and 233 are made, power is provided from power source 4 at contact 5 through relay contact 232, through normally closed contacts 234 and 235 of relay tube R-54 and through contact 233 to complete a circuit energizing relay R-53 to maintain contacts 232 and 233 closed and at the same time maintain power to heater 236. Also, contact 232 supplies power to the window circuits, typically window solenoid S-70 through window closed interlock or limit switch 241 to ground. When solenoid S-70 is energized contact 242 is made furnishing power to window motor M-20 having one side normally grounded by lead 243. After a given delay, whether or not window closing interlock switch 241 is opened, contacts 234 and 235 of relay R-54 open due to the heating of heater 236 thus cutting the power supplied to relay R-53 and breaking the circuit to solenoid S-70 hence stopping the window motors, such as M-20.

The invention has been disclosed with reference to various embodiments which are exemplary and not limiting. Further, the invention has been disclosed with general reference to window closing systems and power locking systems in conjunction with sufficient circuits, diagrams and explanation to enable those skilled in the art to practice the invention hereof. Also, other modifications and changes to the invention will be immediately apparent to those skilled in the art and all such modifications and changes are deemed to be within the scope of the invention which is limited only as necessitated by the scope of the appended claims.

What is claimed is:

1. An automatic window closing and door locking system for a vehicle comprising a master control device to condition the system for automatic operation, setting means to activate the master control, a drive motor for opening and closing a window, a solenoid having an armature with lock and unlock positions for operating a door lock, a source of power to energize the drive motor and the solenoid, interlock means effective during automatic operation to couple the source of power to energize the drive motor to close any open window whenever the solenoid armature is in the unlocked position, means to deenergize the drive motor whenever the windows are closed, control means activated by the interlock means operative to couple the source of power to energize the solenoid to move the armature to the locked position, and means within said master control device to maintain the drive motor and the solenoid disabled during automatic operation so long as the armature remains in the locked position.

2. An automatic window closing and door locking system for an automobile comprising a master control device for automatic operation, switch means to activate the master control, a drive motor for opening and closing a window, a solenoid having a door latch armature with a lock and unlock position, a source of power to energize the drive motor and the solenoid, said master control device including first relay means effective during automatic operation to couple the source of power to energize the drive motor to close an open window whenever the door latch armature is in the unlock position, a delay relay means energized by operation of said first relay means to couple the source of power to energize said solenoid to move the door latch armature to the locked position, means to de-energize the drive motor when said window is closed, and override means to prevent operation of the drive motor circuit whenever the vehicle ignition switch is in the operating position.

3. A door locking and window closing system for a vehicle comprising a door locking solenoid having an armature with a lock and unlock position, said door locking solenoid being manually operable to lock and unlock the door, a drive motor to close and open a window, a source of power adapted to energize the solenoid and the drive motor, control means including first relay means responsive to an unlocked condition of said door latch armature to connect said source of power to energize the drive motor to close an open window, means to de-energize the drive motor when said window is closed, and said control means including second relay means energized by said first relay means and effective following a predetermined time delay for drive motor actuation to connect said source of power to energize the door locking solenoid to move the armature to the locked position.

4. The apparatus of claim 3 including ignition controlling override switch means effective to disable the drive motor when the ignition system is functioning.

5. An automatic automobile door locking and window closing system comprising a plurality of door locking members movable between locked and unlocked positions and each having closed switch means in the unlocked position, a plurality of solenoid means to operate the door locking members to the locked position, a master control including a first delay relay and master switch means, said master control being responsive to any closed switch means of the door locking members to energize said first delay relay, a plurality of window drive motors, a window relay energized by said first delay relay to activate the window motors to close any open window, limit switch means to disable said window motors when said windows are closed, and said master control including a second delay relay energized by said first delay relay after a predetermined time lapse, a door locking relay energized by said second delay relay to activate said solenoid means and operate said door locking members.

6. An automobile automatic door locking and window closing system comprising a master door locking and unlocking member, a plurality of individual door locking and unlocking devices including door latch switches coupled to said master door member and responsive thereto for locking and unlocking the respective doors whenever said master door member is locked or unlocked, a delay relay connected to each door latch switch and being energized whenever any such switch detects an unlocked condition, a first control relay energized by said delay relay to activate the locking mechanism of said master door member, a window drive means to open and close windows, a delay holding relay, a second control relay energized by said delay relay for energizing said delay holding relay, said delay holding relay when energized being operative to supply power to said window drive means for a predetermined period of time to permit said window drive means to close said windows.

7. The apparatus of claim 6 wherein said master door locking and unlocking member includes means to deactivate the automatic system.

8. The apparatus of claim 6 wherein a window limit switch deactivates the window drive means when the window is fully closed.

9. The system of claim 6 wherein an ignition controlling override switch deactivates the second control relay.

References Cited by the Examiner
UNITED STATES PATENTS

| | | | |
|---|---|---|---|
| 2,105,830 | 1/1938 | Aiken | 296—44 |
| 2,576,816 | 11/1951 | Wahlberg | 180—82 |
| 2,696,981 | 12/1954 | Ayers. | |
| 2,834,420 | 5/1958 | Guess | 180—82 |
| 3,135,545 | 6/1964 | Abrams | 296—44 |

BENJAMIN HERSH, *Primary Examiner.*

E. E. PORTER, *Examiner.*